ized Sept. 30, 1969

3,470,139
POLYMERIZATION OF CAPROLACTAM IN THE PRESENCE OF CATALYST, INITIATOR AND A CRYSTALLIZATION MODIFIER
Geoffrey Marshall, Derby, and Gordon Ernest Smith, Chaddesden, Derby, England, assignors to Courtaulds Limited, London, England, a British company
No Drawing. Filed Jan. 13, 1966, Ser. No. 520,391
Claims priority, application Great Britain, Jan. 14, 1965, 1,636/65
Int. Cl. C08g 41/00, 51/00
U.S. Cl. 260—78                                1 Claim

ABSTRACT OF THE DISCLOSURE

In the manufacture of shaped bodies by simultaneously polymerizing and molding nylon 6, voids in the molded body are avoided by carrying out the polymerization and molding in the presence of a crystallization modifier which is (a) a polyether having the formula

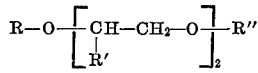

where R and R'' are alkyl radicals of 3 to 5 carbon atoms and R' is hydrogen or methyl; or (b) a normal paraffin of 12 to 16 carbon atoms.

---

The present invention relates to improvements in the process of simultaneously polymerizing and molding caprolactam. It is known to form shaped bodies of nylon 6 by placing a heated mixture of caprolactam and an initiator of polymerization, for example the composite initiator of N-acetyl caprolactam and sodiocaprolactam in a mold where the mixture remains until polymerization is complete and the polymer has solidified sufficiently to be taken from the mold without suffering distortion.

It is noticeable that the polymer as it cools tends to crystallize first in the cooler parts and, inevitably, these are at the surface of the body. The nylon 6 polymer shrinks as it crystallizes and molten or plastic polymer is drawn in from environmental regions of the body to make good the local shrinkage. As the cooling process extends deeper into the body, voids are frequently created where the polymer crystallizes in an immobile environment.

The present invention changes the normal process of crystallization to the extent that voids in the shaped bodies occur less frequently.

According to the present invention caprolactam is polymized and molded in the presence of crystallization-modifier chosen from the group consisting of:

(a) A polyether having the following formula

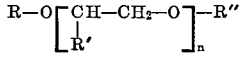

where R and R'' are alkyl radicals containing 3 or more, say 3 to 5, carbon atoms, R' is hydrogen or methyl and $n$ is an integer, and (b) A paraffin having a boiling point of more than 190° C. and particularly normal paraffins having from 12 to 16 carbon atoms.

The preferred polyethers are the di-n-butyl ether of diethylene glycol and the analogous diamyl ether. The effect of the di-n-propyl ether of diethylene glycol is not so pronounced as either of these specific polyethers, but nevertheless considerably mitigates the problem of voids created by the polymer crystallizing from the outside of the shaped body.

As was stated earlier, the preferred paraffins have from 12 to 16 carbon atoms and, therefore, include n-dodecane, n-tridecane, n-tetradecane, n-pentadecane and n-hexadecane.

The crystallization-modifiers actually reverse the pattern of crystallization so that crystals form on the inside first. Although the mechanism of the activity of the modifiers is as yet imperfectly understood, it appears that they delay the onset of crystallization at the surface rather than encouraging crystallization in the interior. Nevertheless, the surprising outcome is that crystallization starts in the interior and extends through the body with the outer skin being the last part to be affected. The shrinkage accompanying crystallization therefore causes a small but perceptible inward collapse of the body and eliminates or significantly reduces the incidence of voids.

The voids which are created by a body crystallizing from the outside are the frequent visible signs of an internal strain which is a still more frequent phenomenon induced by this pattern of crystallization. An internally strained body has a poorer impact resistance than the same body without strains, so that it has been the general practice to anneal a massive body. By inverting the pattern of crystallization, the present process manufactures bodies which are strain-free or have a lower internal strain so that the annealing process may either be dispensed with, or made less rigorous. To obtain the maximum benefit of this invention the modifier should be present to the extent of at least 3 percent by weight based on the caprolactam, and in general it is unnecessary to use more than 10 precent by weight. The invention is illustrated by the following examples in which parts and percentages are by weight.

EXAMPLE 1

A mixture of 100 parts of caprolactam, 1.2 parts of acetyl caprolactam and 8 parts of the di-n-butyl ether of diethylene glycol was dried at 100° C. and at a pressure of 0.2 mm. Hg before 0.15 part of sodium was added at the same temperature. The temperature of the mixture was then raised to 160° C. to initiate polymerization. The mixture was immediately poured into a mold having a cylindrical cavity of 3½ inches diameter and 6 inches length. The polymerization was substantially complete after 5 minutes. It was noticeable that crystallization started near the centre of the mass of the polymer and splayed outwards from there until the whole mass was rendered crystalline.

Analysis of the polymer showed that 4.7 percent of the mass was soluble in methanol and that the polymer had an impact strength of 2.6. The polymer became white on soaking in boiling water.

The polymer cylinders were tested for impact resistance by dropping a 12 lb. weight onto them from a height of 6 feet. The cylinders were taken to have passed the test if they survived six of these impacts.

The results of the tests were as follows:

Cylinders consisting of polycaprolactam—47 percent passed.

Cylinders consisting of polycaprolactam and the di-n-butyl ether of diethylene glycol—61 percent passed.

EXAMPLE 2

The procedure of Example 1 was followed with the single exception that the di-n-butyl ether of diethylene glycol was replaced by 8 parts of n-dodecane. The cylinders of the polymer all passed the standard impact resistance test, whereas of cylinders made at the same time with no crystallization-modifier, only 29 percent passed.

What we claim is:

1. In a process for making molded articles of polycaprolactam wherein a caprolactam polymerization mixture is placed in a mold and, in the presence of an anionic catalyst and cocatalyst, is simultaneously polymerized and shaped to conform to said mold, the improvement which comprises incorporating in said mixture, in a proportion ranging from about 3 to 10%, based on the weight of caprolactam, a crystallization modifier selected from the group consisting of (a) polyethers having the formula

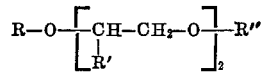

where R and R'' are alkyl radicals having 3 to 5 carbon atoms and R' is hydrogen or methyl, and
(b) normal paraffins having from 12 to 16 carbon atoms.

References Cited
UNITED STATES PATENTS

| | | | |
|---|---|---|---|
| 2,241,321 | 5/1941 | Schlack | 260—78 |
| 3,296,063 | 1/1967 | Chandler | 260—29.1 |
| 3,061,592 | 10/1962 | Schnell et al. | 260—78 |
| 3,166,533 | 1/1965 | Wichterle et al. | 260—78 |
| 3,252,905 | 5/1966 | Schaeffer | 260—33.6 |
| 3,298,977 | 1/1967 | Robertson et al. | 260—33.6 |
| 3,308,099 | 3/1967 | Mermoud et al. | 260—33.6 |

HAROLD D. ANDERSON, Primary Examiner

U.S. Cl. X.R.

260—33.2, 33.6; 264—176